United States Patent [19]
Korhonen et al.

[11] Patent Number: 6,099,240
[45] Date of Patent: Aug. 8, 2000

[54] METHOD AND APPARATUS FOR HANDLING SHEET STACKS

[75] Inventors: Antti Korhonen, Hollola; Pentti Välimäki, Lahti, both of Finland

[73] Assignee: Sunds Defibrator Panelhandling OY, Nastola, Finland

[21] Appl. No.: 08/849,479

[22] PCT Filed: Dec. 21, 1995

[86] PCT No.: PCT/FI95/00699

§ 371 Date: Aug. 25, 1997

§ 102(e) Date: Aug. 25, 1997

[87] PCT Pub. No.: WO96/20121

PCT Pub. Date: Jul. 4, 1996

[30] Foreign Application Priority Data

Dec. 23, 1994 [FI] Finland .................................. 946069

[51] Int. Cl.⁷ .................................................. B65G 63/00
[52] U.S. Cl. ......................... 414/802; 414/417; 414/459; 414/790.1
[58] Field of Search .................................. 414/254, 459, 414/460, 790, 790.1, 800, 810, 416, 417

[56] References Cited

U.S. PATENT DOCUMENTS

| 3,675,801 | 7/1972 | Larson et al. | 414/417 |
| 3,703,243 | 11/1972 | Monk . | |
| 5,456,562 | 10/1995 | Schlecker et al. | 414/254 |

FOREIGN PATENT DOCUMENTS

| 0431346 | 6/1991 | European Pat. Off. . | |
| 0047079 | 5/1973 | Finland . | |
| 2336710 | 2/1975 | Germany . | |
| 2519227 | 11/1976 | Germany . | |
| 28 16 182 | 10/1979 | Germany | 414/459 |
| 3-3858 | 1/1991 | Japan | 414/790 |
| 7414494 | 5/1976 | Sweden . | |

Primary Examiner—Janice L. Krizek
Attorney, Agent, or Firm—Birch, Stewart, Kolasch & Birch, LLP

[57] ABSTRACT

The invention relates to a method and apparatus for handling sheet stacks, in which sheet stacks including at least one sheet are moved into a storage area with the help of handling apparatuses into sheet piles of at least one sheet stack. By virtue of the support beds, a handling apparatus and a straddle carrier, and a flexible and efficient buffer storage system for sheet stacks are provided for interfacing with existing sheet processing lines.

6 Claims, 6 Drawing Sheets

METHOD AND APPARATUS FOR HANDLING SHEET STACKS

This application is the national phase under 35 U.S.C. §371 of PCT International Application No. PCT/FI95/00699 which has an International filing date of Dec. 21, 1995 which designates the United States of America.

BACKGROUND OF THE INVENTION

1. Field of the Invention

The present invention relates to a method for handling sheet stacks.

Furthermore, the invention relates to an apparatus for handling sheet stacks.

2. Description of Background Art

Known in the art are handling systems for sheet stacks in which the storage of the sheet stacks is implemented using stacker trucks. However, the use of stacker trucks requires plenty of space between the piled sheet stacks and wide truck aisles. Moreover, storage handling of sheet stacks using stacker trucks is difficult to automate.

Also known are systems using transfer beds for the transport of sheet stacks to the storage. The sheets are stacked in high piles which are then transferred to the storage by means of a transfer bed. The transfer beds travel in the storage under sheet stacks piled on supports such as concrete pillars. Such systems are hampered by, the limitation that sheet stacks piled in the storage can be picked from the storage only in a certain order, which prevents random picking of the sheet stacks, e.g., directly from the center of the sheet stack storage. Moreover, the storage requires complicated and expensive foundations.

Further known is a storage system in which the sheet stacks are stored on a pallet with a planar top surface. After stacking, a lift carrier is used to transfer the sheet stack piled on the pallet to the storage. In practice the handling of such sheet stack pallets has proven complicated. They require purpose-designed handling equipment to be used on the processing lines of the sheets. The pallet must be transferred into a stacking station, where the sheets are piled one by one into stacks onto the pallet. When unloading the sheets from such a pallet, the sheets must again be removed one by one from atop the pallet for use on a processing line. Having a conventional construction, the pallets require an operating environment comprising dedicated handling equipment, a pallet storage from which they are fed to the stacking device of the processing line of the sheets, and additionally, equipment for collection and transfer of the pallets back to the storage. Such arrangements are often extremely complicated and require different kinds of equipment for handling the pallets.

SUMMARY OF THE INVENTION

It is an object of the present invention to provide a method and apparatus capable of overcoming the disadvantages of conventional techniques.

More specifically, the method according to the invention is characterized by what is stated in the appended claims.

The embodiment according to the invention offers a plurality of significant benefits. The pallet construction employed in the system according to the present invention makes it possible, i.e., that the pallet obviates the need for dedicated feed and stacking equipment on the processing lines of the sheets. Moreover, the pallet stays all the time in the storage equipment or the storage area, whereby no space reservation is required along the processing lines for the pallet stacks. This arrangement further assures that the pallet would not inadvertently land into the sheet-processing line. Moreover, the clumsiness of separate circulation and collection of the pallets is avoided. The capacity of the present system is improved particularly by the property that a plurality of pallets may be piled atop each other in the handling apparatus. Thus, the handling apparatus can perform a second function as a sort of buffer storage for the pallets.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention will be examined in greater detail with reference to an exemplifying embodiment illustrated in the appended drawings, in which.

DETAILED DESCRIPTION OF THE DRAWINGS

Figure 1:
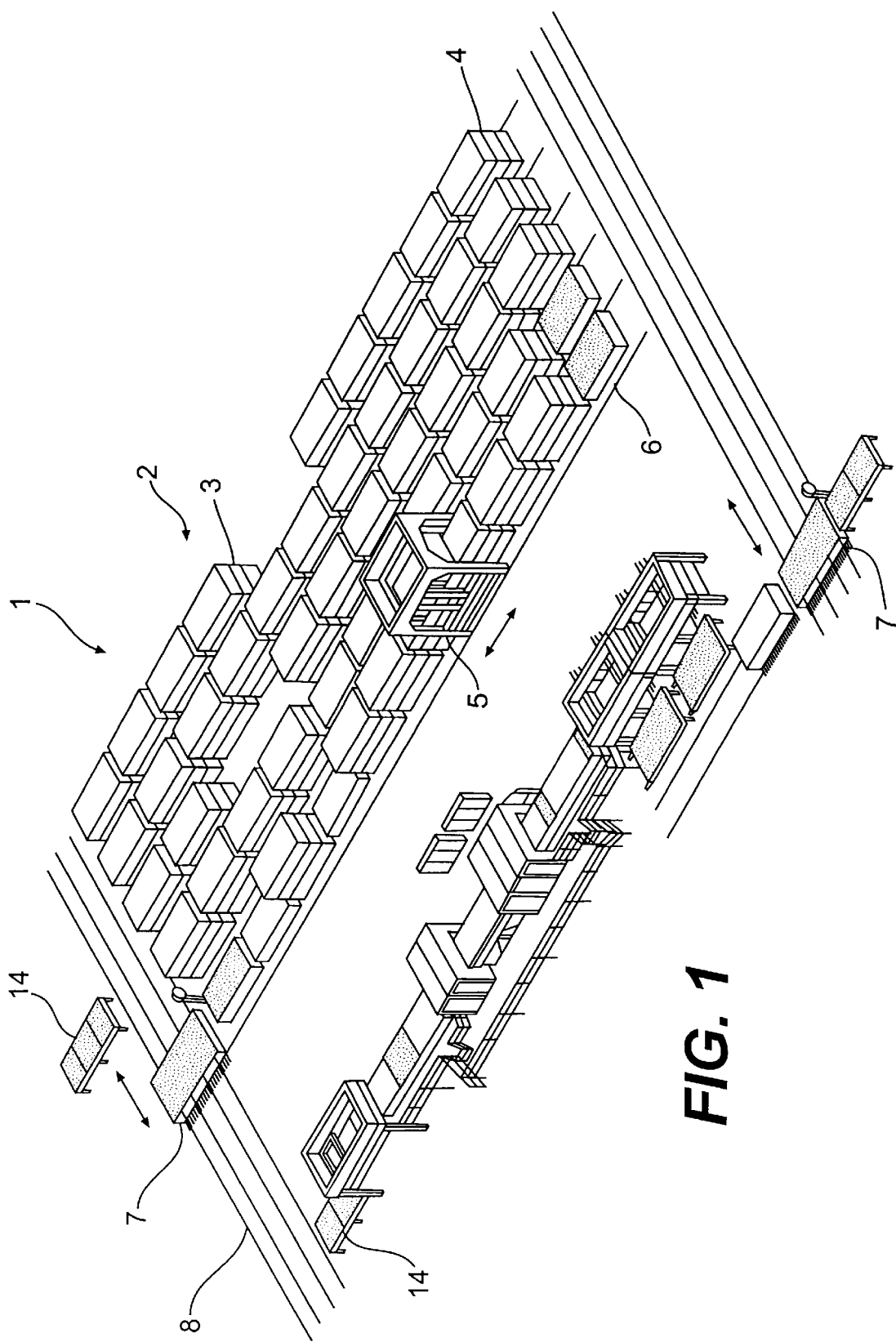
FIG. 1 is a perspective top view of a handling apparatus according to the invention.
Figure 2:
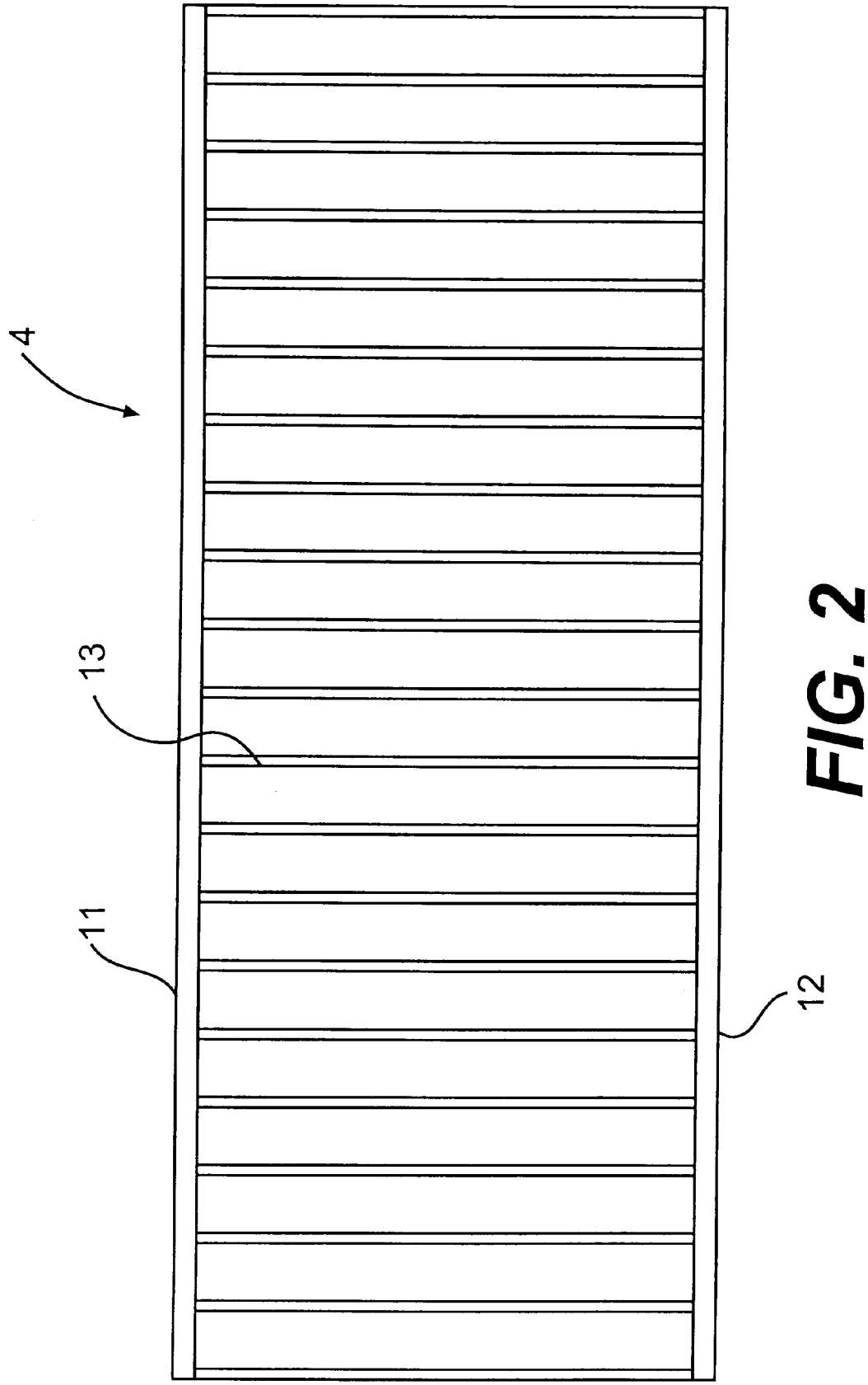
FIG. 2 is a top view of a support bed employed in the apparatus.

Referring to FIG. 1, an embodiment of a sheet handling apparatus according to the invention is shown therein. The apparatus layout includes a storage area 1 in which the sheet stacks 2 are stored in piles 3. The sheet stacks 3 arranged in rows of successive stacks form a storage row. The number of successive sheet stacks in a row as well as the number of parallel storage rows may be varied as required. The sheet stacks 2 are piled on a support bed 4 called a pallet later in the text. Transfer of the sheet stacks 2 and the pallets 4 in the storage area is arranged by means of a straddle carrier 5. The straddle carrier 5 is advantageously of the wheeled straddle carrier type of overhead crane also known as a lukki carrier, whereby the sheet stack to be lifted and transferred is moved elevated between the high wheeled legs of the straddle carrier. The straddle carrier is arranged to move along a track 6 formed by, e.g., rails with the help of conventional drive means. The straddle carrier 5 is equipped with a lift device capable of moving the sheet stacks with their pallets into the storage piles 3 and off the storage piles, respectively. Each storage row is situated between a pair of adjacent rails 6 forming the track, whereby the storage row remains between the wheeled legs of the straddle carrier.

An essential part of the system is a handling apparatus 7. The handling apparatus is equipped with transfer elements 9 suited for receiving a sheet stack 2 from, e.g., processing lines and forwarding them to further processing. The pallet 4 is adapted to fit onto the handling apparatus 7 so that the top level of the transfer elements 9 of the handling apparatus and the lower surface of the sheet stack 2 are in contact with each other when the pallet 4 is in the handling apparatus. Most advantageously, the pallets 4 are lowered onto support members such as beams adapted to the frame of the handling apparatus.

According to a preferred embodiment, the pallet is formed by two longitudinal support beams 11, 12 between which is adapted a plurality of transverse support beams 13. The longitudinal support beams 11, 12 are shaped to provide, or alternatively, are equipped with projections at which the lift of a straddle carrier 5 can elevate the pallet. The pallet has a ladder construction. Thus, the transverse support beams 13 form a support structure under the sheet stack being handled. The pallet can be lowered onto the handling apparatus so that the transfer elements 9 or at least a portion thereof are aligned between the longitudinal support beams 11, 12 and the transverse support beams 13 can negotiate the gap between the adjacent transfer elements 9, whereby the sheet stack 2 remains supported by the transfer elements 9 when the pallet 4 is lowered below the top level of the transfer elements. The dimensions of the pallet 4 are advantageously larger than the largest sheet size being handled. When desired, several sheet stacks with smaller dimensions can be piled adjacently on a single pallet.

In the above-described exemplifying embodiment, a transfer bed 7 arranged to travel transversely oriented relative to the storage rows is used as the handling apparatus. The transfer bed 7 is most advantageously adapted to run along a track 8. In the case illustrated in FIG. 1, the storage area is provided with two transfer beds which are located at the opposite ends of the storage rows. The transfer bed is provided with transfer elements 9 for receiving a sheet stack from, e.g., processing lines and transferring them from the bed to further processing. Additionally, the transfer bed is equipped with rails 10 along which the straddle carrier 5 can run onto the transfer bed 7. The transfer elements 9 are advantageously comprised of a roller track which is powered by means of an electric drive such as an electric motor and a chain transmission train. The bottom surface of the lowermost sheet in the sheet stack 2 is in contact with the transfer elements 9 of the transfer bed.

When transferring a sheet stack from the processing line to the storage, a pallet 4 is placed on a transfer bed 7, which next moves to a reception position 14 where the sheet stack 2 is moved, advantageously with the help of conveyor means, onto the transfer bed 7, onto the transfer elements 9. The transfer bed 7 is next moved along rails 8 to that storage row where the straddle carrier 5 is located. The straddle carrier 5 is driven onto the transfer bed 7. The transfer bed 7 with the straddle carrier 5 now on it is driven to that storage row into which the sheet stack is intended to be piled. The lift device of the straddle carrier grabs the uppermost pallet 4 loaded on the transfer bed 7 at the pallet corners, thereby lifting the pallet and simultaneously the sheet stack 2 resting on it off from the transfer bed. The straddle carrier 5 moves off from the transfer bed 7 onto the rails 6 of the storage row and transfers the sheet stack 2 into the desired storage position.

When transferring a sheet stack 2 from the storage to, e.g., a sheet-processing line, the lift device of the straddle carrier 5 picks from a storage pile 3 the pallet 4 on which the sheet stack rests and elevates the pallet with the sheet stack 2 resting on it. Next, the straddle carrier 5 moves along its track to the transfer bed 7 which has moved at the same storage row. After the rails 10 of the transfer bed 7 are aligned with the rails of the track 6 of the straddle carrier 5, the straddle carrier 5 moves on the rails onto the transfer bed and lowers there the pallet with the sheet stack onto the transfer bed 7. The pallet 4 is lowered supported by the transfer elements 9 of the transfer bed below the top level of the support bed, while the sheet stack 2 is left resting on the transfer elements 9. The straddle carrier 5 is moved from the transfer bed 7 to the storage track 6 and the transfer bed 7 moves into a position, where the sheet stack is intended to be transferred to further processing, such a position being a feed conveyor 14 of a sheet-processing line, for instance. The transfer elements 9 of the transfer bed such as rollers move the sheet stack 2 to the conveyor 14 of the processing line, where the pallet 4 remains on the transfer bed 7. Also in this case the pallet 4 need not be moved away from the equipment of the storage system to the processing line area. The sheet stacks 2 may be removed from the pallets 4 in stacks and not as single sheets. The transfer bed 7 is immediately ready to receive a new task from the control equipment of the storage system.

Figure 3:
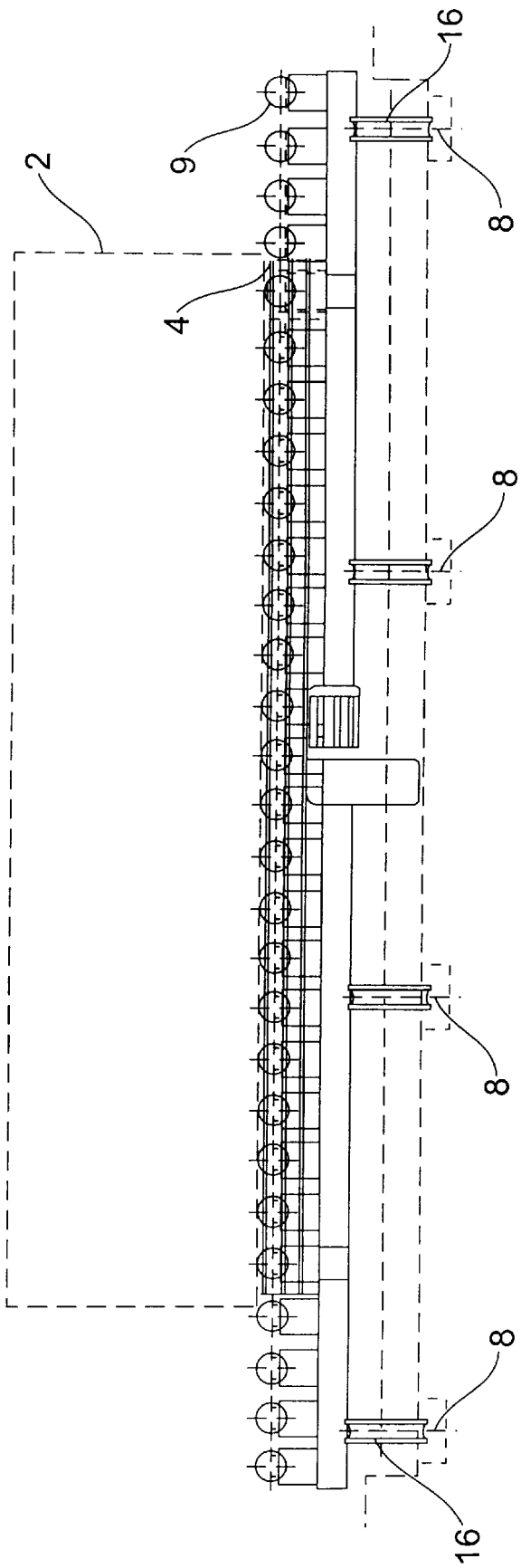
FIG. 3 is a side view of a transfer bed employed in the apparatus.
Figure 4:
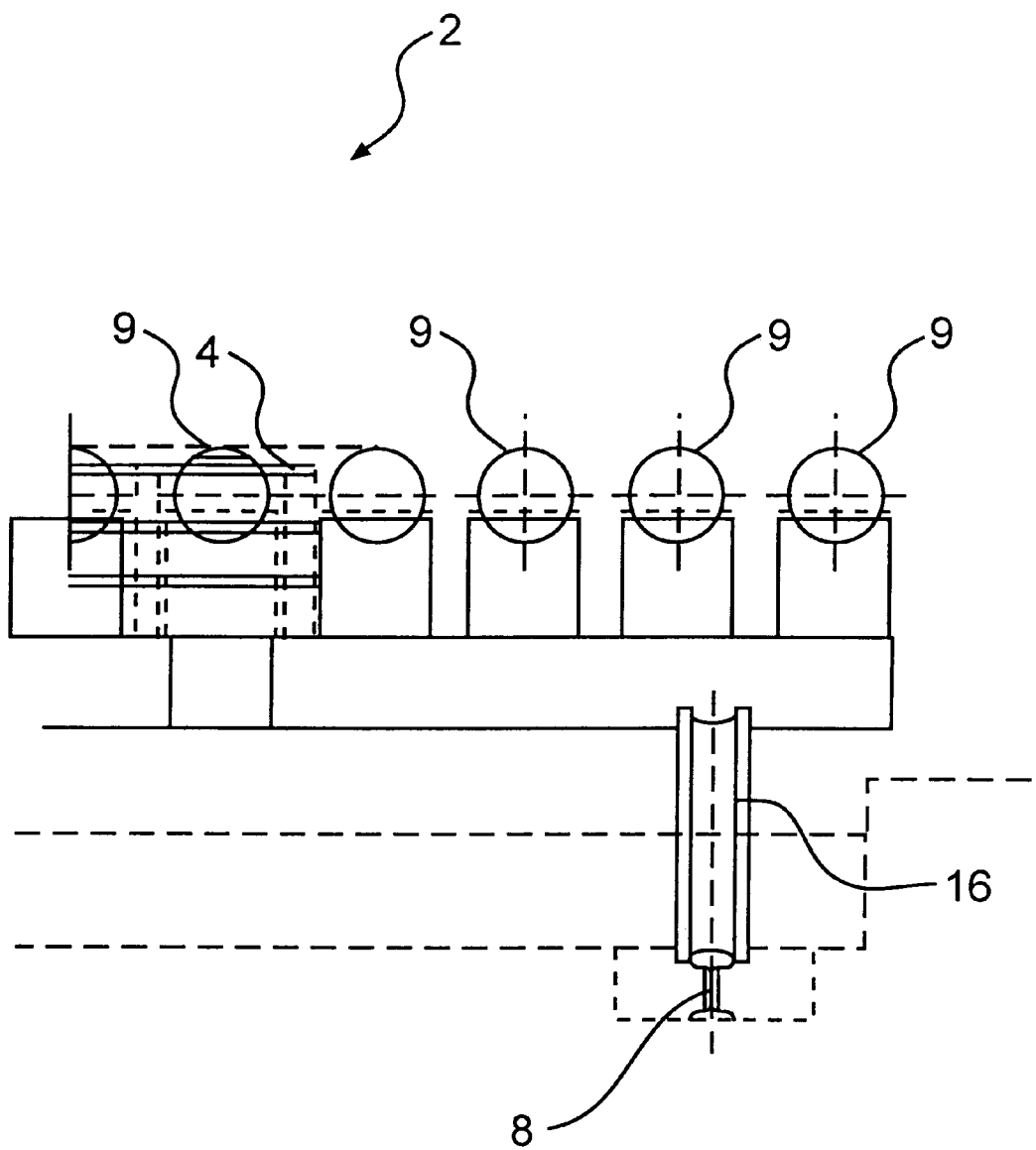
FIG. 4 is an enlarged detail of FIG. 3.
Figure 5:
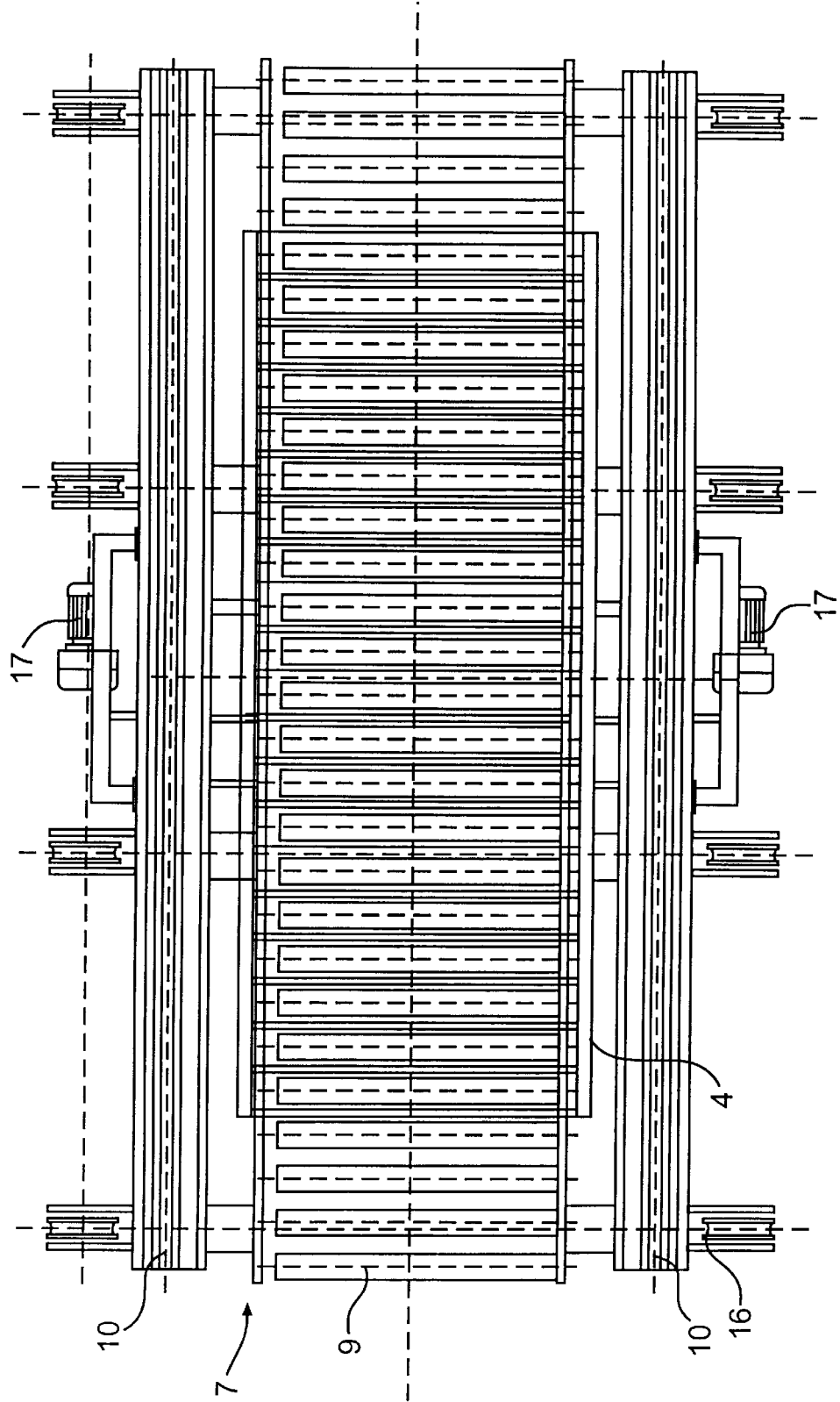
FIG. 5 is a top view of the transfer bed.

In an embodiment of the invention, a number of the pallets 4 may be stacked on one another (cf. FIGS. 3 and 4) on the transfer bed 7 so that the top surface of the uppermost pallet 4 remains below the upper level of the transfer elements 9 of the transfer beds. Accordingly, the transfer bed 7 is provided with sufficient space to accommodate a number of support beds 4 of which the top level of the uppermost support bed remains lower than the top level of the transfer elements 9. This detail contributes essentially to the high transfer capacity of the storage system according to the invention. Hence, the transfer bed 7 can serve as a storage buffer for the pallets 4. Such a property is particularly advantageous when the capacity of the processing line feeding the sheet stacks into the storage differs essentially from the capacity of the processing line consuming the sheet stacks from the storage. This property thus makes the pallet handling more flexible and faster.

The straddle carrier 5 is equipped with devices (not shown) for the positional location of the pallet 4. The system includes sensor elements such as photosensors adapted to the grabber elements 15 of the lift unit of the straddle carrier and corresponding identification means adapted to the pallet 4 such as reflective areas.

The grabber elements 15 grab the pallet 4 at least by two edges on opposite sides of the pallet. The grabber elements 15 are additionally provided with conventional interlock means assuring positive hold of the grabber elements on the pallet. Such interlock elements are, e.g., inductive proximity sensors and pressure switches included in the pressurized-medium drive system actuating the grabber elements.

The straddle carrier 5 is also arranged to receive and transfer a desired number of empty pallets 4 from one place to another. Owing to the flexibility of the storage system according to the invention, the user may freely define the storage locations used for storing the empty pallets 4. In practice, the empty pallets are typically stored stacked in piles close to the track of the transfer bed 7, advantageously in the first storage position of the storage row. In a storage having transfer beds at both ends of the storage row, the empty pallets are stored at both ends of the storage row.

The transfer bed is most advantageously adapted movable on wheels 16 running on rails. The wheels are driven by a drive system comprising at least one electric motor 17 driven by a frequency converter. In the embodiment illustrated in the drawings, the transfer elements 9 of the transfer bed comprise a roller track and a drive system actuating the roller track by means of an electric motor and a chain transmission comprised of chains and chain sprockets. Further, the transfer bed includes rails 10 for the roll-in of the straddle carrier 5 along said rails 10 onto said transfer bed 7. The straddle carrier 5 drives onto the transfer bed in the following occasions: to move from one storage row to another; to lift sheet stack from transfer bed to storage; to lift sheet stack from storage onto transfer bed; to lift empty pallets from transfer bed into storage; and to lift empty pallets from storage onto transfer bed.

In the system according to the invention, the pallet is used every time the sheet stack is lifted and moved by means of the straddle carrier.

Figure 6:
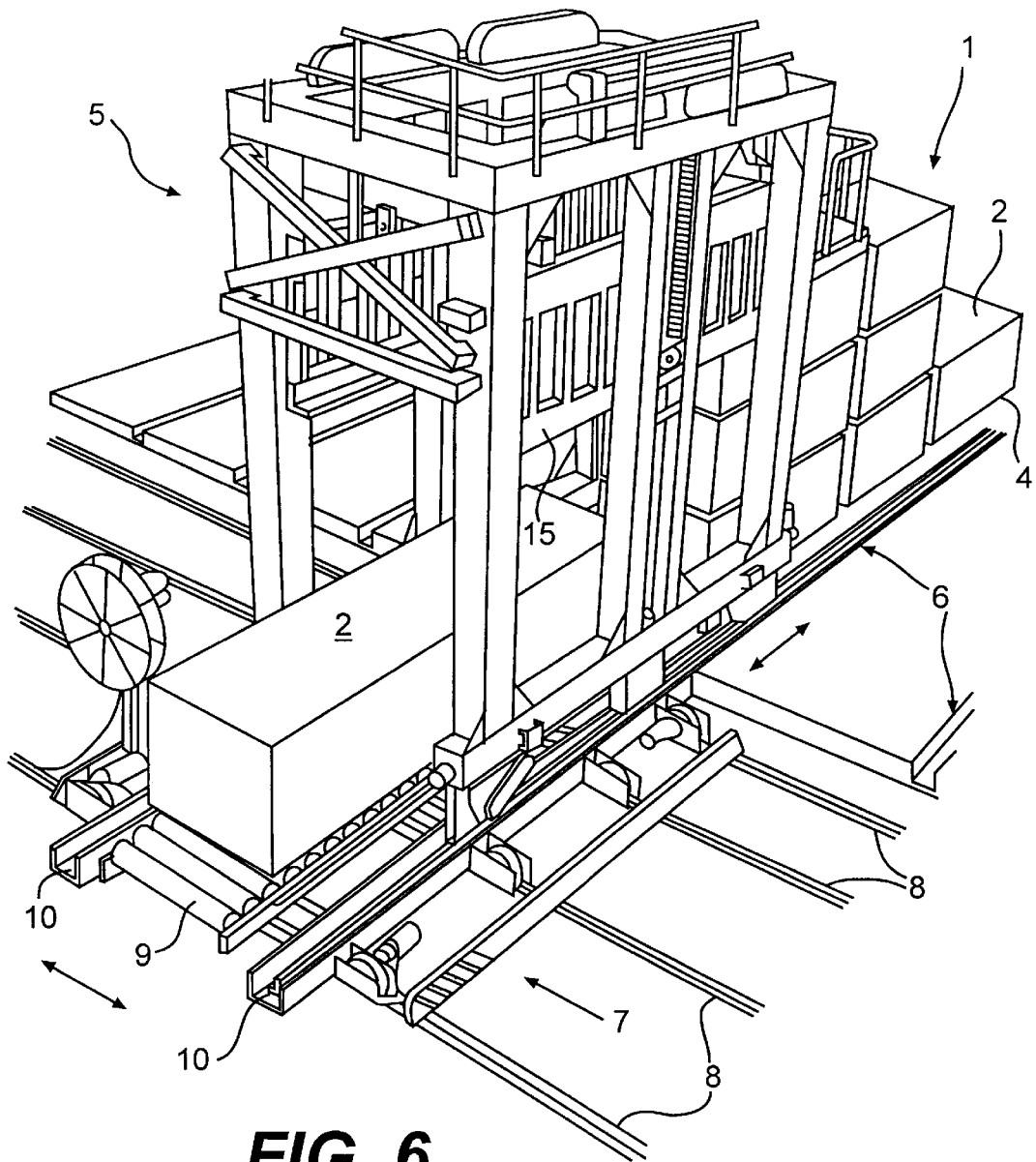
FIG. 6 is a perspective view of the straddle carrier entering the transfer bed.

Now referring to FIG. 6, the roll-in of the straddle carrier 5 onto the transfer bed 7 is elucidated in detail.

The storage system, straddle carrier and transfer bed are controlled by an automatic control system comprising, e.g., at least one programmable logic control unit and a storage management system run by a computer. Obviously, such a system also facilitates the use of manual control.

In another preferred embodiment the handling apparatus 7 may be, e.g., a conveyor (not shown) capable of transferring the sheet stack to further processing or onto a transfer bed so that the support bed remains on the conveyor. Then, the end of each storage row is equipped with a conveyor capable of handling the support bed and on which conveyor the sheet stack can be moved by means of, e.g., a transfer cart when the support bed is already on the conveyor. Correspondingly, when the storage is being unloaded, the sheet stack is first moved by means of the straddle carrier onto the conveyor, which then transfers the sheet stack into the transfer cart, while the support bed remains on the conveyor. In such an arrangement, there are two separate handling apparatuses, of which one takes care of operations on the support bed and the other serves for the transfer of the sheet stacks. In the transfer bed 7 described for the exemplifying embodiment, these two functions are combined.

Typical transfer functions related to the storage operations in the manufacture of wood-based boards are, i.a.: transfer of sheet stack from press line to storage; transfer of sheet stack from storage to grinding line; transfer of sheet stack from storage to truck roller track; transfer of sheet stack to travelling crosscut saw unit; transfer of sheet stack to piling line; transfer of sheet stack from grinding line to storage; transfer of empty pallets from pallet stack into empty transfer cart; transfer of empty pallets from transfer cart to pallet stack of storage.

To those versed in the art it is obvious that the invention is not limited to the exemplifying embodiments described above, but rather, can be varied within the scope of the annexed claims. Thus, the handling apparatus 7 may comprise a variety of different apparatus embodiments. Additionally, the transfer elements 9 may be comprised of different types of conveyors.

We claim:

1. A method of handling sheet stacks, comprising the steps of:

forming sheet stacks having at least one sheet;

placing a support bed on a handling apparatus so that a top level of the support bed remains below a top level of roller transfer elements disposed on the handling apparatus;

moving each sheet stack over the roller transfer elements of the handling apparatus;

elevating the support bed which in turn elevates a respective sheet stack off of the roller transfer elements; moving the support bed with a respective sheet stack to a storage position; and storing each sheet stack so that a respective sheet stack rests on a respective support bed.

2. The method of claim 1, wherein said handling apparatus includes a wheeled transfer bed, the method further comprising the steps of:

moving each sheet stack onto respective roller transfer elements of the transfer bed;

moving the transfer bed along a track to an end of a storage row where a straddle carrier is located;

driving the straddle carrier along a track onto the transfer bed;

elevating the support bed with a respective sheet stack disposed thereon by lifting devices of the straddle carrier so that the support bed with the respective sheet stack are spaced from the roller transfer elements of the transfer bed;

moving the straddle carrier with the support bed and a respective sheet stack resting thereon to a storage row by utilizing the transfer bed;

moving the straddle carrier into the storage row; and lowering each sheet stack resting on a respective support bed into a storage location.

3. The method of claim 2, further comprising the step of:

placing at least one empty support bed onto the transfer bed by utilizing the lifting devices of the straddle carrier prior to moving the sheet stack onto the transfer bed.

4. A method of handling sheet stacks, comprising the steps of:

forming sheet stacks having at least one sheet;

elevating a support bed having a respective sheet stack disposed thereon by a lift device of a straddle carrier;

moving the straddle carrier with the support bed and sheet stack resting thereon adjacent to a handling apparatus of a storage row;

lowering the support bed with a respective sheet stack resting thereon towards roller transfer elements of the handling apparatus;

lowering the support bed past the roller transfer elements while resting the sheet stack on the roller transfer elements, whereby a top level of the support bed remains below a top level of the roller transfer elements; and moving the sheet stack off from the handling apparatus by using the roller transfer elements, while the support bed remains on the handling apparatus.

5. The method of claim 4, further comprising the steps of:

using a transfer bed as the handling apparatus;

moving the transfer bed to a storage row;

lowering a support bed with a respective sheet stack resting thereon onto the transfer bed;

placing a respective sheet stack on the roller transfer elements of the transfer bed while simultaneously withdrawing the support bed past the roller transfer elements into a space for holding the support bed, whereby the top level of the support bed remains below a top level of the roller transfer elements;

moving the straddle carrier away from the transfer bed;

moving the transfer bed to an output position; and moving the sheet stack using the roller transfer elements off from the transfer bed, whereby the support bed remains on the transfer bed.

6. The method of claim 5, further comprising the step of:

moving unused support beds with the straddle carrier off from the transfer bed into a storage position of empty support beds.

* * * * *